(12) United States Patent
Aggarwal et al.

(10) Patent No.: US 10,656,976 B2
(45) Date of Patent: *May 19, 2020

(54) USER DATA MANAGEMENT ACROSS MULTIPLE APPS ON A USER DEVICE

(71) Applicant: PAYPAL, INC., San Jose, CA (US)

(72) Inventors: Vijeyta Aggarwal, Los Altos, CA (US); Kevin Ward, Campbell, CA (US); Larry Wang, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,624

(22) Filed: Jan. 29, 2019

(65) Prior Publication Data
US 2019/0324824 A1    Oct. 24, 2019

Related U.S. Application Data

(63) Continuation of application No. 15/199,451, filed on Jun. 30, 2016, now Pat. No. 10,191,785.

(51) Int. Cl.
*G06F 3/00* (2006.01)
*G06F 9/54* (2006.01)
*G06F 8/61* (2018.01)

(52) U.S. Cl.
CPC ............. *G06F 9/541* (2013.01); *G06F 8/61* (2013.01)

(58) Field of Classification Search
CPC ........................................................ G06F 9/54
USPC ........................................................ 719/310
See application file for complete search history.

(56) References Cited

U.S. PATENT DOCUMENTS

| | | | |
|---|---|---|---|
| 9,324,206 B2 | 4/2016 | Saarisalo | |
| 9,467,834 B2 | 10/2016 | Guday et al. | |
| 9,588,750 B2 | 3/2017 | Hoy et al. | |
| 10,269,043 B1* | 4/2019 | Gratz | G06Q 30/0271 |
| 2012/0036498 A1 | 2/2012 | Akirekadu et al. | |
| 2012/0203862 A1* | 8/2012 | Tayeb | G06F 8/61 709/217 |
| 2012/0214451 A1* | 8/2012 | Richardson | H04W 12/12 455/414.1 |
| 2013/0332723 A1 | 12/2013 | Tan et al. | |
| 2014/0281548 A1 | 9/2014 | Boyer et al. | |
| 2015/0066742 A1 | 3/2015 | Chatterton et al. | |
| 2015/0088756 A1 | 3/2015 | Makhotin et al. | |

(Continued)

OTHER PUBLICATIONS

Joshua Schiffman, DAuth: Fine-grained Authorization Delegation for DistributedWeb Application Consumers. (Year: 2010).*

*Primary Examiner* — Lechi Truong
(74) *Attorney, Agent, or Firm* — Haynes & Boone, LLP

(57) ABSTRACT

Systems and methods for managing user data across multiple apps are disclosed. An example method includes, determining that an installation of a first app on a user device is completed; identifying a second app in which a user has been authenticated and has been installed on the user device; obtaining a second set of user information associated with the user from the second app; and configuring a user account of the user in the first app using the second set of user information. In some implementations, identifying the second app is executed in response to determining that the installation of the first app on the user device is completed. In some other implementations, identifying the second app is executed in response to a user selection of the first app after the installation.

20 Claims, 8 Drawing Sheets

(56) References Cited

U.S. PATENT DOCUMENTS

| | | |
|---|---|---|
| 2015/0161616 A1* | 6/2015 | Brunet ................. G06Q 30/016 713/1 |
| 2015/0350106 A1 | 12/2015 | Whalley et al. |
| 2015/0355893 A1 | 12/2015 | Luk et al. |
| 2015/0379460 A1 | 12/2015 | Zamer |
| 2016/0182658 A1* | 6/2016 | Allinson ............. H04L 67/1097 709/224 |
| 2016/0197773 A1 | 7/2016 | Pandrangi et al. |

* cited by examiner

US 10,656,976 B2

USER DATA MANAGEMENT ACROSS MULTIPLE APPS ON A USER DEVICE

CROSS REFERENCED TO RELATED APPLICATIONS

The present application is a continuation application of U.S. patent application Ser. No. 15/199,451, filed on Jun. 30, 2016, the disclosure of which is hereby incorporated by reference in its entirety.

TECHNICAL FIELD

The present disclosure relates generally to data management and in particular to user data management across multiple apps on a user device.

BACKGROUND

Requiring a user to replicate data from one app to another app can be time-consuming and hence frustrating.

For example, after downloading a ride-sharing app onto a smartphone, a user may be required to re-enter locations where she frequents into the ride-sharing app, even though she has already provided that information in a map app installed on the smartphone. The problem exacerbates when a user uses a large number of apps that share data across those apps.

There is therefore a need for a device, system, and method, which reduces the amount of user effort required for automatically sharing, in one application, user data previously provided to another application.

Figure 1:
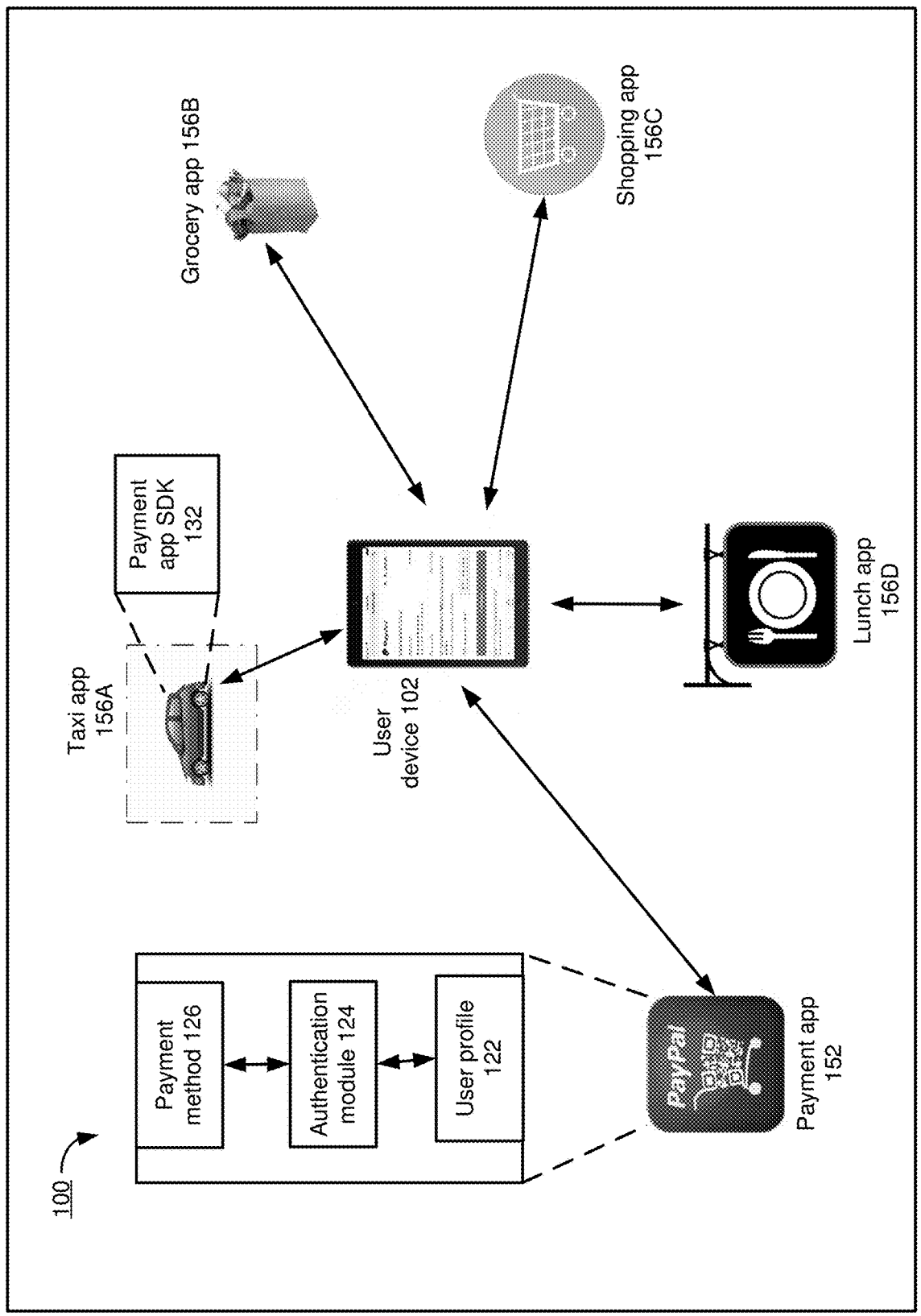
FIG. 1 is a schematic view illustrating an embodiment of a system for managing user data across multiple apps.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for managing user data (e.g., a favorite payment method or a favorite location where a user frequents) across multiple apps installed on a user device.

In one implementation, when a user downloads a new app onto her user device, the software development kit (SDK) included in the new app may execute itself to identify another app (installed on the user device) in which the user has authenticated herself (which is also referred to as a logged-in app in the present disclosure). The newly-installed app may, through one or more Application Programming Interfaces (APIs) provided in the SDK to determine what user information, if any, can be obtained from the logged-in app.

For example, after a user installs a ride-sharing app on her smartphone, an SDK in the ride-sharing app may check an app registry stored on the smartphone. The app registry may include a list of apps currently installed on the smartphone and another list of logged-in apps (into which the user has successfully logged).

After checking the app registry, the ride-sharing app's SDK may determine that the user has successfully logged into a payment app installed on the smartphone. Information stored in the payment app may then be used to help the user to either (1) register a new account or (2) configure (e.g. modify or update) an existing account, in the ride-sharing app.

In a "new account registration" case, for example, user information available from the payment app (e.g., a user's home address, billing address, name, and date or birth) may be used to prefill a user registration page in the ride-sharing app, thereby reducing the user effort needed complete the account registration process in the ride-sharing app, especially when the user device is equipped with a limited user input means, e.g., a small touchscreen or a tiny keyboard.

In a "configuring an existing account" case, for example, user information available from the payment app (e.g., the user's home address, billing address, and the default or otherwise preferred payment method) may be used to configure the payment method featured needed in the ride-sharing app. For example, the user's preferred payment method may have changed (e.g., from a personal credit card account to a corporate credit card account) since the last time the user used the ride-sharing app, and thus the preferred payment method currently-registered in the payment app may override an existing (and possibly obsolete) payment method in the ride-sharing app. For another example, if the payment app specifies that the user has designated a particular credit card account (e.g., one that provides a higher cash back reward) as the default payment method, the ride-sharing app's SDK may register the particular credit card account also in the ride-sharing app and further designate the particular credit card as the sole payment method in the ride-sharing app.

The systems and methods described in the present disclosure can provide a variety of technical advantages.

First, cognitive burden on a user to provide common information (e.g., a favorite payment method) to several different apps or each and every time she installs a new app on a user device of hers may be reduced. Second, cognitive burden on the user to restore or configure her preferences in a newly-installed app may also be reduced. For example, once a user designates a particular credit card (e.g., a credit card with a high cash back earning program) as her default or favorite payment method, any apps that require payment information to function properly (e.g., a money transfer app, a banking app, and a car financing repayment app) can identify this preference and configure the payment methods therein accordingly. Third, app providers may gain a greater degree of fine-tuning control and offer this option to secure their presence on a user device and increase user retention.

Additional details of implementations are now described in relation to the Figures.

FIG. 1 is a schematic view illustrating an embodiment of a system 100 for managing user data across multiple apps. The system 100 may comprise or implement a plurality of servers and/or software components that operate to perform various technologies provided in the present disclosure.

As shown in FIG. 1, a user device 102 may have a plurality of apps installed thereon, e.g., a payment app 152, a grocery app 156B, a shopping app 156C, and a lunch app 156D. The user device may be a smartphone, a laptop computer, a notebook computer, a mobile computer, or a desktop computer.

The payment app may include a user profile 122, an authentication module 124, and information identifying one or more user-provided payment methods 126. The user profile 122 may include information identifying a user whose account is active in the payment app 152 or under whose account the payment app 152 is operating (e.g., processing payments). The user profile 122, for example, may include a user's full legal name, home address, billing address, favorite shipping address, date of birth, and dining preference.

The payment method 126 includes information identifying a payment instrument, e.g., a credit card account, a checking account, a debit card account, and a line of credit account.

The authentication module 124 may authenticate a user on the payment app 152 using one or more authentication means. In one embodiment, the authentication module 124 may authenticate a user based on a user name and a corresponding password. In another embodiment, the authentication module 124 may authentication a user (e.g., on the payment app 152) using Fast IDentify Online (FIDO) technologies. The passwordless FIDO technology is supported by the Universal Authentication Framework (UAF) protocol. In some embodiments, a user registers her device to the online service by selecting a local authentication mechanism such as swiping a finger, looking at the camera, speaking into the microphone, entering a PIN, etc. The UAF protocol allows the service to select which mechanisms are presented to the user.

A user may also authenticate herself on the user device or in an app using other authentication means, e.g., a second factor FIDO authentication. A second factor FIDO authentication allows an app or a user device to augment the security of their existing password infrastructure by adding a strong second factor. A user may login with a username and password as before. The app or user device can additionally prompt the user to present a second factor authentication means or device at any time it chooses. The strong second factor may simplify login passwords (e.g. 4-digit PIN) without compromising security. Once a user successfully authenticates herself on an app installed on the user device, the app can be deemed as a logged in app.

As indicated in Figure, the taxi app 156A is being downloaded from an app store and installed on a user device 102, which also hosts a variety of other apps 156. Upon the completion of the installation of the taxi app 156A, the system 100 may automatically configure the taxi app 156A, which may include providing information available from one or more existing apps on the user device 102 (e.g., apps that were installed on the user device 102 and optionally configured by a user in some way, before the taxi app was installed). Alternatively, the system 100 may configure the taxi app 156A at a later time, e.g., during its first user execution or after a predefined amount of time has passed since it was first installed on the user device, either of which may indicate that a user is interested in the taxi app 156A and thus user data may be provided to ensure that the user can execute the taxi app as she wishes or consistent with other apps she uses. These delayed-configuration technologies share user data with an app when a user has expressed at least some amount of interest in the app (e.g., as evidence by an attempted execution thereof), thereby avoiding the user data from being unnecessarily disseminated to apps that the user has installed but otherwise has no interest of executing (e.g., zombie apps) and reducing the overall risk of user data being unnecessarily exposed and comprised.

The system 100 may automatically obtain user data from multiple (e.g., two or more) existing apps to configure a newly-installed app. For example, the system 100 may configure the payment method in the taxi-app 156A based on payment method identified from the payment app 152, while configuring the user-favorite locations in the taxi-app 156A based on (1) the restaurant locations where the user frequents as identified from the lunch app 156D and (2) the grocery store locations where the user orders groceries as identified in the grocery app 156B.

Configuring one app based on data obtained from multiple apps is technically advantageous, because a new app (e.g., a meal delivery app) may require multiple categories of information (e.g., a payment method, a user's favorite vegetable, and a dinning restriction) in order to be functional or operable. These multiple categories of user information may not available through a single app. Automatically obtaining information from multiple apps as needed to configure a new app may therefore further reduce user effort needed to configure the new app.

Figure 2:
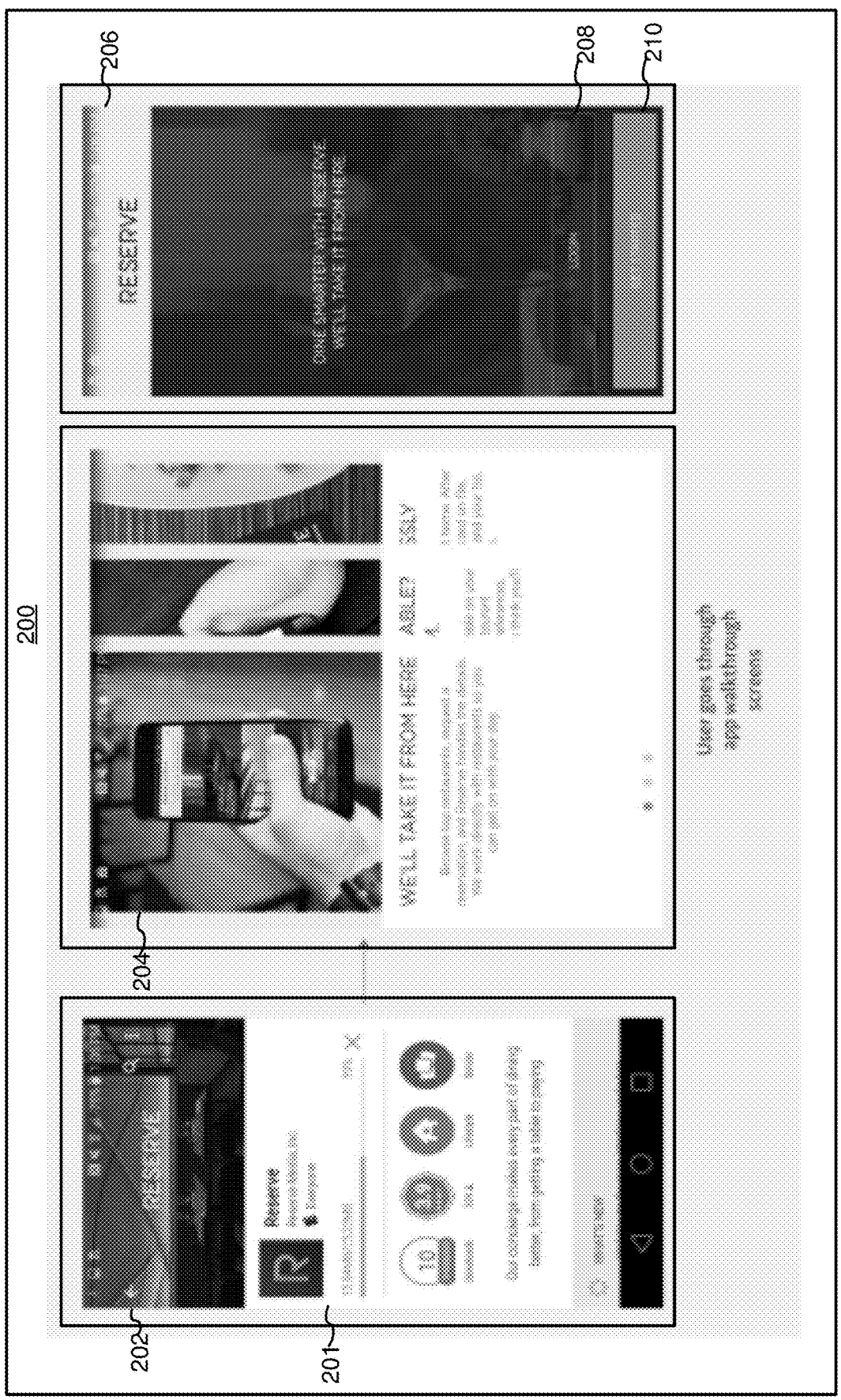
FIG. 2 includes one or more screen images illustrating an embodiment of a method for managing user data across multiple apps on a user device.

FIG. 2 includes one or more screen images illustrating an embodiment of a method 200 for managing user data across multiple apps on a user device.

As shown in FIG. 2, once a ride-sharing app 201 is installed on a user device, e.g., smartphone, a user may select the app for execution. The screen image 202 shows an initial user interface presented on the user device. The user interface shown in the screen image 202 may be replaced by those shown in the screen image 204 in accordance with one or more user inputs, e.g., one or more finger gestures. As shown in the screen image 206, a user may be asked to log (208) into an existing user account in the app or alternatively register/create (210) a new user account, before accessing one or more additional app features.

Figure 3:
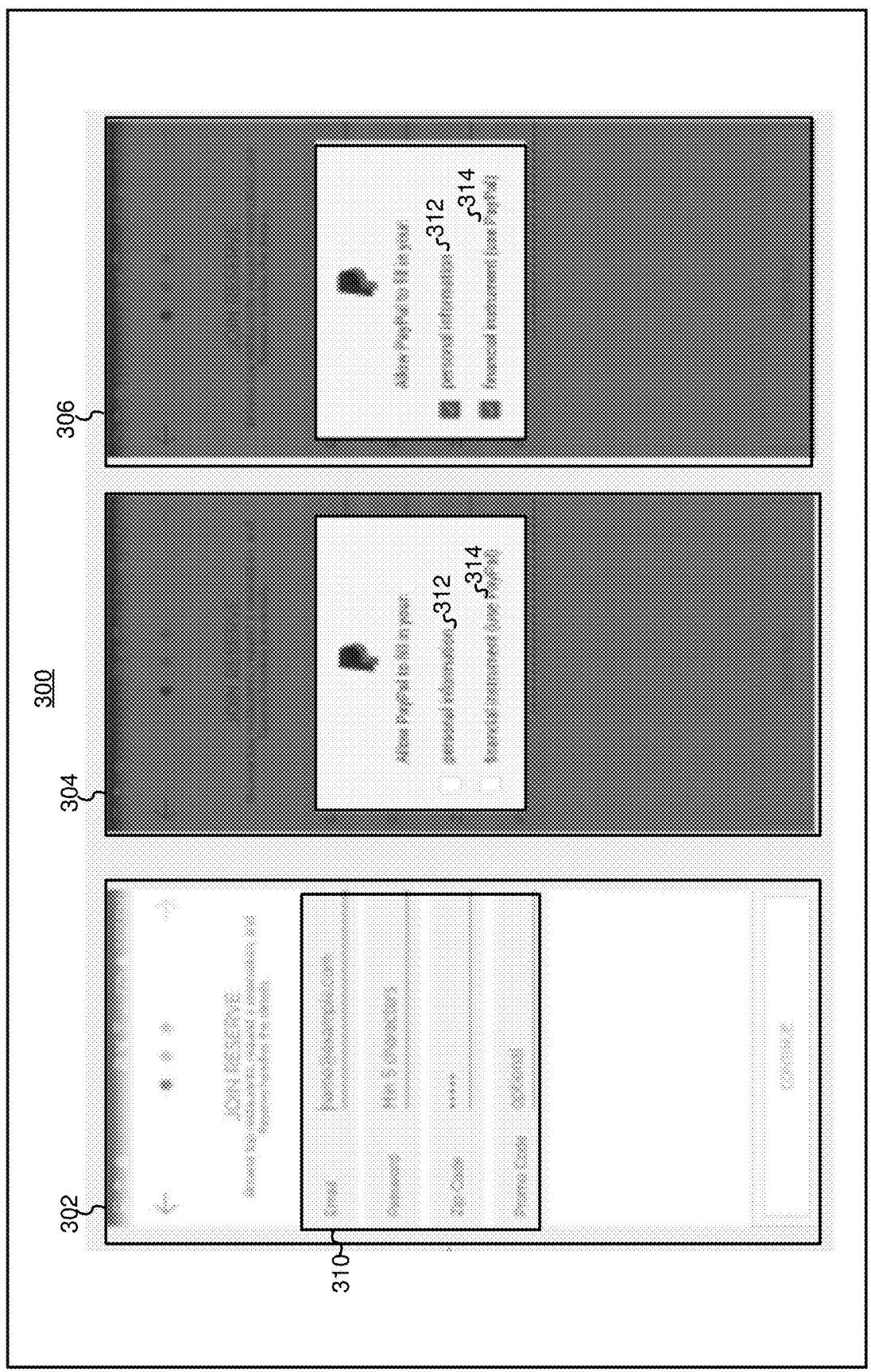
FIG. 3 includes one or more screen images illustrating an embodiment of a method for managing user data across multiple apps on a user device.

FIG. 3 illustrates a method 300 for registering a new account using information obtained from one or more existing apps. As shown in the screen image 310, to register a new account in the ride-sharing app 201, a user may manually provide user identifying information 310, e.g., an email address as a login user name, a corresponding password, a zip code, and optionally a promotion code. Each information entry may have one or more security requirements. For example, a proposed password must include more than 5 characters, and the email used as a proposed user name must be a working email address. Therefore, in the aggregate, requiring a user to manually provide account registration information to make a new app "up-and-running" may require a significant amount of user effort. The problem exacerbates when the user device with which a user must interact to complete the registration process is equipped with a limited input means, e.g., a tiny touch-screen.

To avoid requiring a user to manually provide registration information 310, which has serious drawbacks as explained above, the new app needing user information may invoke one or more function calls through an API of a software development kit (SDK) that is part of the app. The API function calls may detect whether any other apps installed on the same user device as the instant app are "feeder" apps, e.g., app that can automatically provide at least a portion of the user information required by the app, such as data needed to complete the registration process.

As shown in the screen 304, a payment app is identified as a feeder app, because the payment app is capable of providing at least two categories of user information needed to complete the new account registration process 310 in the ride-sharing app 201, as shown in screen 302. The first category of user information may include a user's personal information 312, e.g., the user's name, email, and home zip code; and the second category of user information may include a user's financial information 314, e.g., the user's checking account or credit card account.

As shown in the screen 306, the ride-sharing app 201 may import both categories of the user information 312 and 314 and populate at least some of them into the user registration page shown in the screen 302. For example, the ride-sharing app 201 may complete the registration process shown in screen 310 based on the user personal information 312.

Note that although the registration of a payment method may not be required in new account registration process shown in the screens 302, 304, and 306, user payment information stored in the payment app can nevertheless be obtained in advance and in anticipation of such registration at a subsequent registration step or more broadly in a future time, e.g., when a user needs to make a payment after completing a ride using the ride-sharing app 201.

Whether user information may be pulled in advance or in anticipation of future use may be determined based on the nature or the primary functionality of the app needing the user information. For example, a payment method is likely required in a ride-sharing app, and therefore, a user's preferred payment method may be pulled from a payment app and configured into the ride-sharing app during the initial configuration process. In contract, a payment method is likely not required in a map or a weather app, and as a result, a user's preferred payment method may not be pulled from a payment app and configured into the map or a weather app unless or until the user is about to make an in-app purchase. These technologies are technically advantageous as they may save run time performance without exposing user data to unnecessary audiences.

Figure 4:
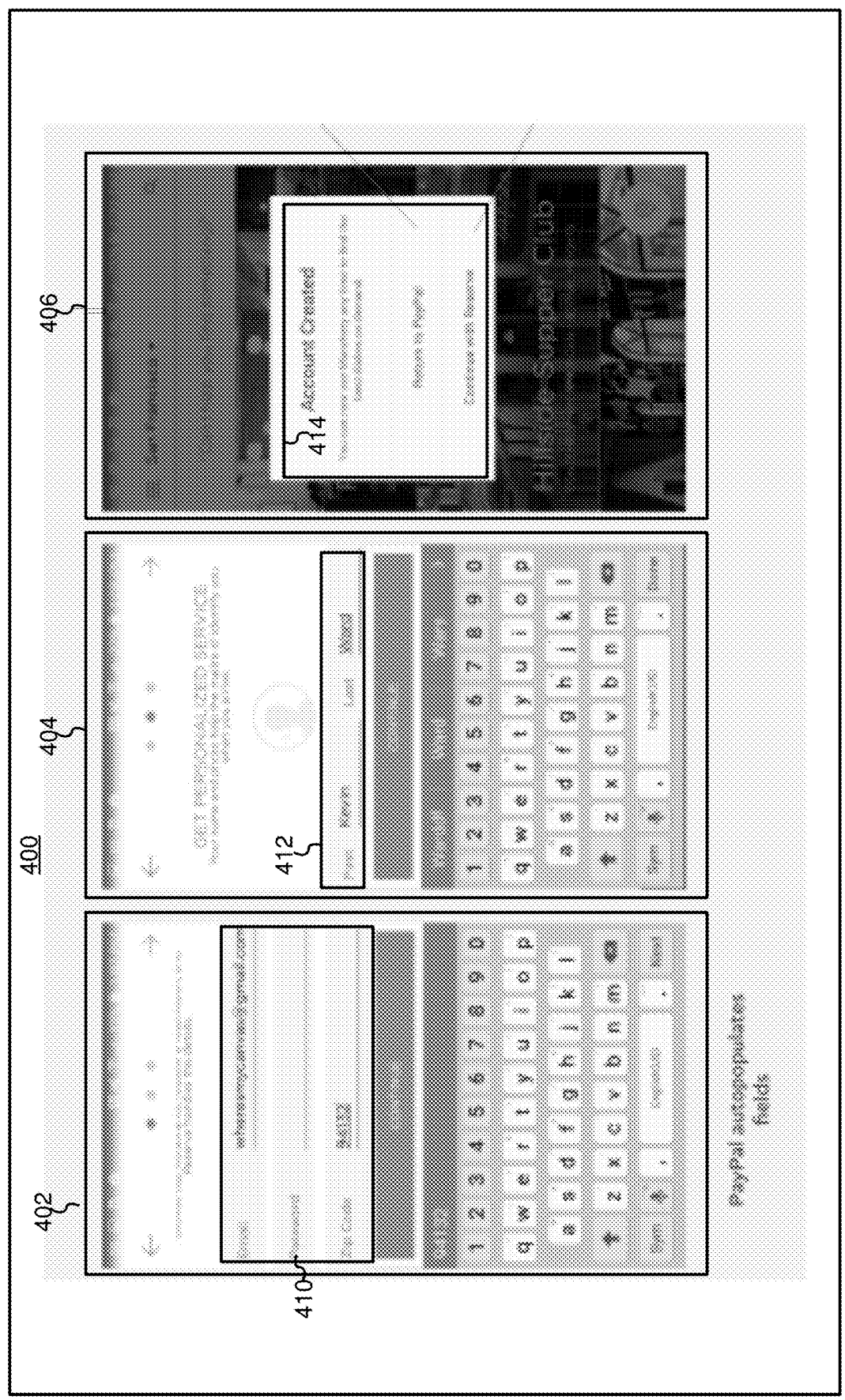
FIG. 4 includes one or more screen images illustrating an embodiment of a method for managing user data across multiple apps on a user device.

FIG. 4 illustrates the next stages 400 for registering a new account in the ride-sharing app 201 using user information obtained from another app. As shown in the screen image 402, one part of the user personal information 312 obtained from the payment app is populated into the corresponding data fields 410. As shown in the screen image 404, another part of the user personal information 312 obtained from the payment app is populated into the corresponding data fields 412.

Because data fields necessary for registering a new user account in the ride-sharing app 201 may be populated with corresponding user information obtained from one or more existing apps, a user may create the new account without manually completing any of the data fields, as shown in the screen image 414. The user is able to manually revise any of the auto-filled data feeds as needed, such as to update old information obtained from the feeder app or the payment app. Any changes to that data may be communicated to other apps that share or use that same type of data, such that the user does not need to update that information multiple times across different apps.

Figure 5:
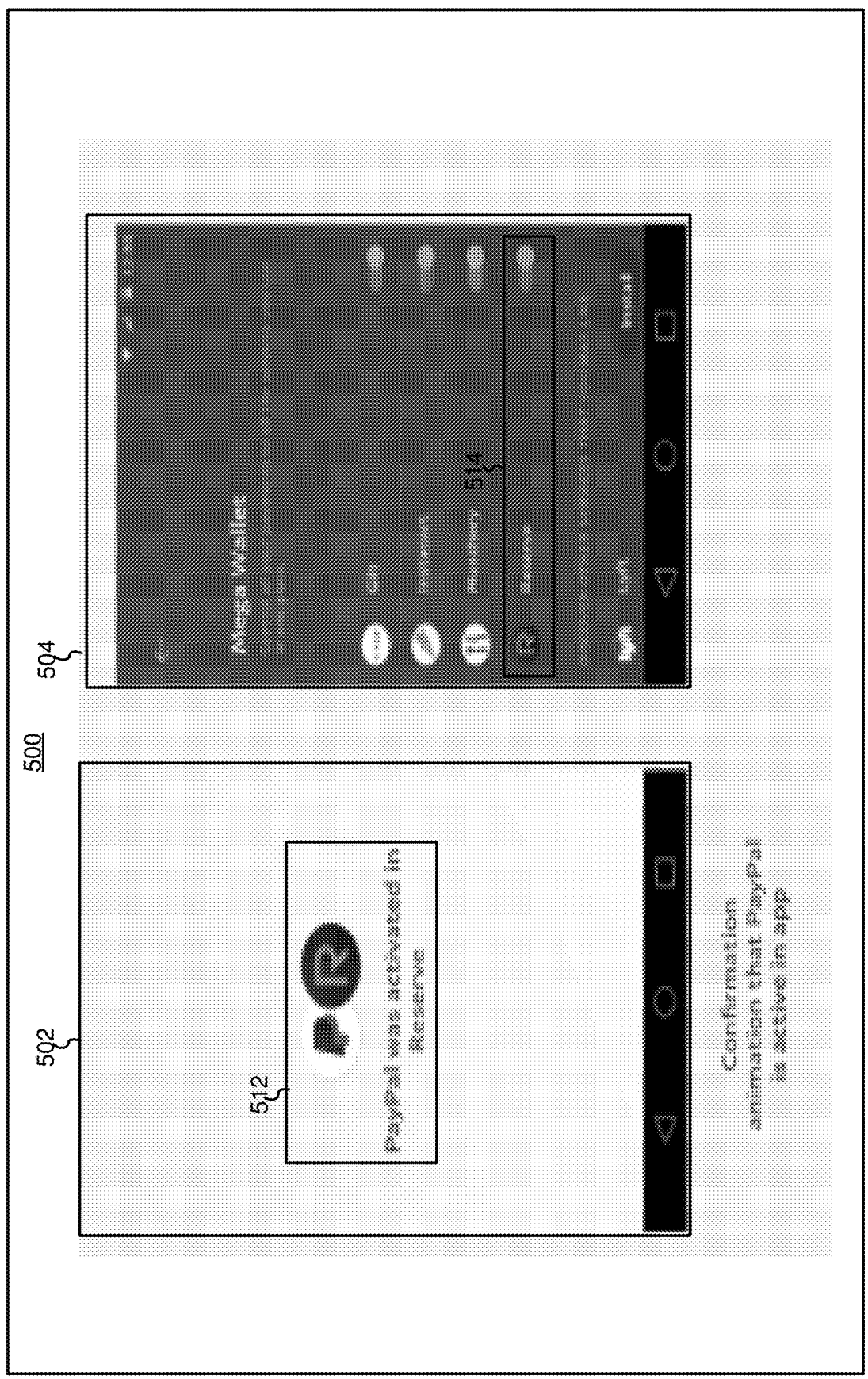
FIG. 5 includes one or more screen images illustrating an embodiment of a method for managing user data across multiple apps on a user device.

FIG. 5 illustrates two confirmation screens 500 illustrating that user financial information 314 is also automatically enabled in the ride-sharing app 201 without requiring manual user inputs.

The screen 502 shows, within the ride-sharing app 201, a confirmation message 512 confirming that one or more payment methods specified in the payment app have now been enabled, after the user financial information 314, including a preferred payment method, is correctly populated into the ride-sharing app 201. The screen 504 shows, within the payment app, a confirmation 514 confirming that the payment app has populated one or more payment methods a user provided to the ride-sharing app 201, and as a result, a user may access the payment method in the ride-sharing app 201.

Figure 6:
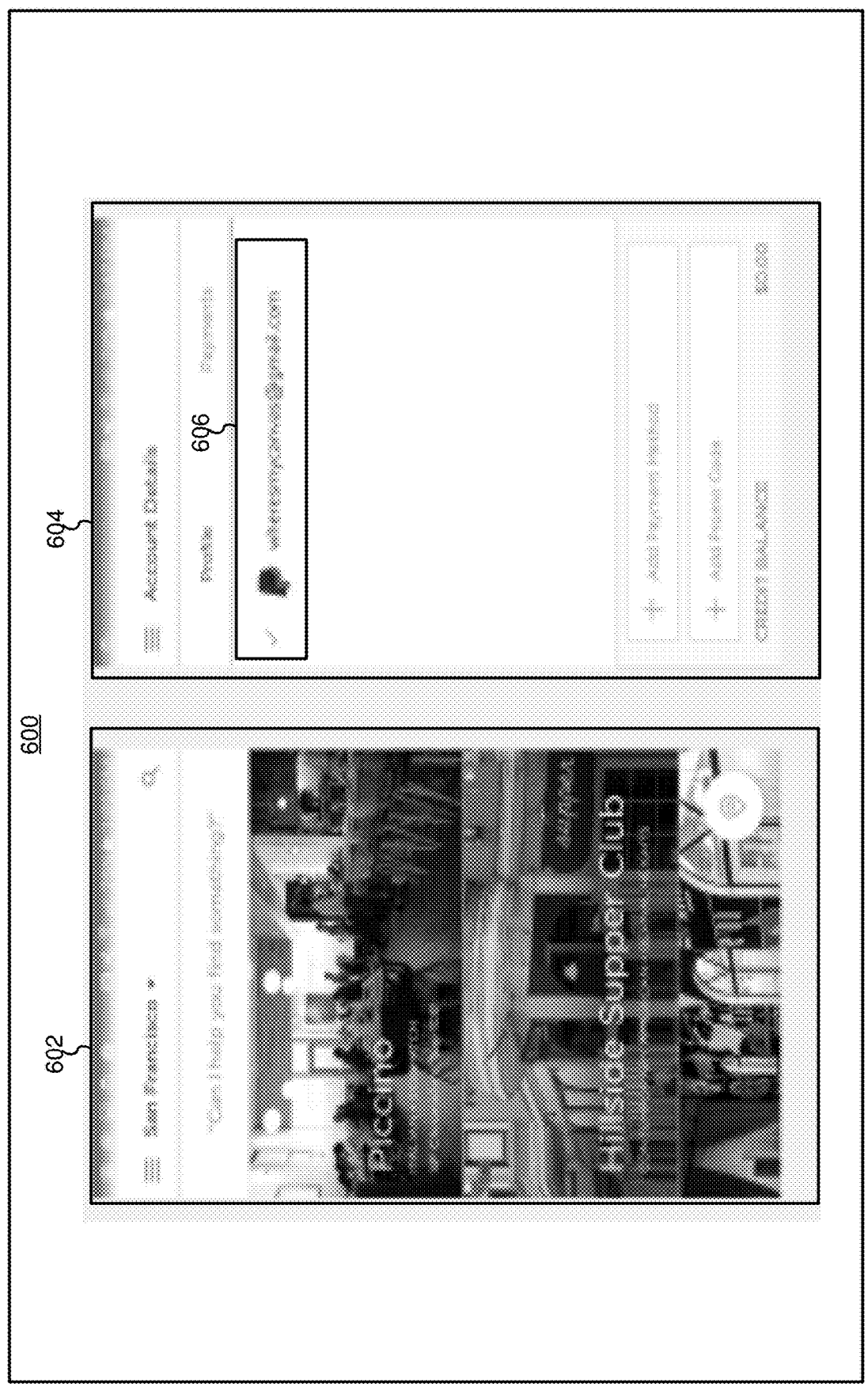
FIG. 6 includes one or more screen images illustrating an embodiment of a method for managing user data across multiple apps on a user device.

FIG. 6 illustrates a method 600 for a user to access, in the ride-sharing app 201, a payment method enabled through a payment app.

As shown in the screen 602, a user is authenticated in the ride-sharing app 201 and thus can access various features of the ride-sharing app 201. As shown in the screen 604, the user may access, within the app, the payment method 606, without switching from the ride-sharing app 201 to the payment app.

Figure 7:
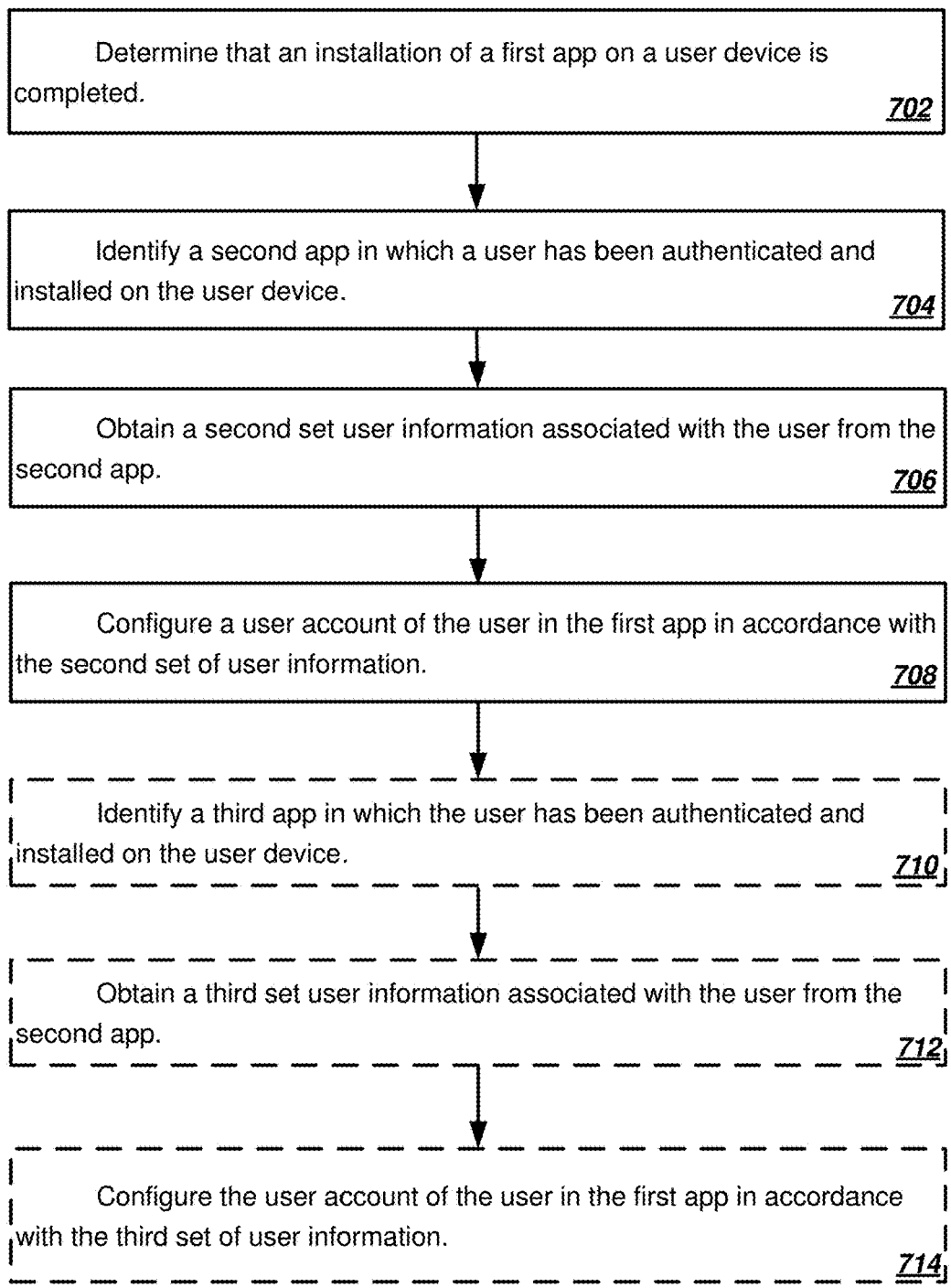
FIG. 7 is a flow chart illustrating an embodiment of a method for managing user data across multiple apps on user device.

FIG. 7 is a flow chart illustrating an embodiment of a method 700 for managing user data across multiple apps on user device.

Making user data stored in one app installed on a user device available to another app installed on the same device may include constantly monitoring which apps are being installed on a user device. Apps recently installed on a user device may be more likely to be in need of user data, e.g., for account registration or other configuration purpose. In another embodiment, data entered or modified by the user in one app may be monitored so that change or new data can be communicated to other apps on the user device.

In some embodiments, the method 700 therefore includes determining (702) that an installation of a first app on a user device is completed. For example, when a taxi app is downloaded onto and subsequently installed on a user device, an app registry stored on the user device may add a new registry entry identifying that taxi app is installed. An existing app running on the user device may check the app registry and identify the taxi app as a recently installed app based on the new registry entry.

The taxi app may include an SDK provided by the publisher, developer, or any kind of sponsor of another app. The taxi app's SDK may include information, e.g., app identifiers, which can identify with which other apps installed on the user device the taxi app may communicate, as well as APIs for the taxi app to communicate with any of these apps. In some embodiments, the method 700 may therefore include: identifying the second app based on an API provided by a SDK included in the second app. Alternatively, the taxi app may execute a search against the app registry using one or more app identifiers to identify which apps are installed or were installed on the user device.

An app (e.g., a new app) may actively seek out logged-in apps present on the same user device to obtain user information therefrom. In some embodiments, the method 700 may thus include identifying (704) a second app in which a user has been authenticated and installed on the user device. For example, through an API call using an app identifier (e.g., search a payment app with an app ID "125446") or based on a search against the app registry, a new app may determine that a user has, after a successful authentication, logged into one or more other apps installed on the user device, e.g., a map app, a restaurant reservation app, a video streaming app, and a payment app.

Data a user previously provided in one app may be automatically provided to a new app, so that the user may more quickly set up a new account in the new app or log into an existing account in the new app.

In some embodiments, for example, the method 700 includes obtaining (706) a second set of user information associated with the user (e.g., a user's full legal name, primary email address, home zip code) from the second app (e.g., a logged-in app) and configuring (708) a user account of the user in the first app (e.g., a new app) in accordance with the second set of user information.

In some embodiments, an app may obtain user information from multiple other apps in order to facilitate a new account registration or to configure an existing account with information obtained from the other apps. The method 700 may therefore additionally include identifying (710) a third app in which the user has been authenticated and installed on the user device; obtaining (712) a third set of user information associated with the user from the second app; and configuring (714) the user account of the user in the first app in accordance with the third set of user information.

In some embodiments, the third set of user information does not overlap with the second set of user information. In other words, user information obtained from multiple apps complement each other and collectively covers more information than that covered by a single app alone, thereby providing a greater amount of user information to an app in need. For example, the taxi app may obtain a user's default payment method from a payment app, while obtaining the user's preferred night-out location from a map app and the user's dinner preferences from a restaurant reservation app.

In some other embodiments, the third set of user information differs from the second set of user information in at least one aspect that is descriptive of a user. For example, the taxi app may obtain a user's preferred payment method from a payment app, while obtaining the user's preferred payment method as well as at least one alternative payment method from a grocery ordering app.

Thus, as described herein, an app may have a more comprehensive set of user information for completing a new account registration or updating existing account information, thereby reducing the need to require a user to manually provide information for account registration or updating.

An app may, upon installation, attempt to obtain user information from another app. In some embodiments, identifying the second app is therefore executed in response to determining that the installation of the first app on the user device is completed. This technique may save response time, as when a user executes a new app, the new app may already have at least some the user information needed for an initial execution.

Alternatively, an app may, upon execution, attempt to obtain user information from another app. In some embodiments, identifying the second app is therefore in response to a user selection of the first app after the installation. This technique may increase data security, as user data stored in one app is pulled or pushed into another app (e.g., a new app) on an as-needed basis, e.g., when a user is attempting to execute the new app. In other words, the user data is not transmitted or made available to a zombie app, e.g., an app installed but never executed.

An app may also attempt to obtain information from another app responsive to an occurrence of a predefined trigger event, e.g., a particular user action or a predefined figure or hand movement on a touchscreen of the user device on which the app is installed. In some embodiments, identifying the second app is therefore executed responsive to a user finger gesture associated with the first app.

As shown in FIGS. 3-4, user information obtained from one app may be populated to another app so that a user can register a new account with reduced effort. In some embodiments, therefore, configuring the user account in the first app comprises registering the user account in the first app; and the method 700 further includes: populating account registration information in the first app in accordance with the second set of user information.

As shown in FIGS. 3-4, user information obtained from one app and made not only available to but also usable in another app may include one or more user preferences applicable to both of these apps. For example, a user-preferred payment method registered in a payment app is not merely enabled in a taxi app, but more importantly also designated as the preferred payment method in the taxi app.

In some embodiments, therefore, configuring the user account in the first app comprises setting a user preference in the user account in the first app; and the method 700 further includes: automatically enabling the user preference in the first app in accordance with the second set of user information.

When the user information obtained from another app includes a user-selected payment method, the user-selected payment method may be automatically enabled in the instant app. In some embodiments, therefore, the second set of user information associated with the user from the second app includes a payment method selected by the user; and configuring the user account of the user in the first app in accordance with the second set of user information comprises: enabling the payment method in the user account of the user in the first app.

Enabling a user-selected payment method in a new app (or any other app) may include (1) disabling an existing payment method previously registered in the new app, (2) overriding a preferred or default status of an existing payment method registered in the new app and giving that preferred or default status to the payment method being enabled; and/or (3) removing or otherwise modifying one or more existing payment methods registered in the new app.

For example, an existing payment method may be retired, de-selected, or deleted from the primary payment method to a secondary backup payment method; an existing payment method may also be removed and replaced with the newly-enabled payment method; and an existing payment method may also be updated in accordance with the newly-enabled payment method (e.g., updating the expiration date of an existing credit card account based on the updated information obtained from a payment app).

Figure 8:
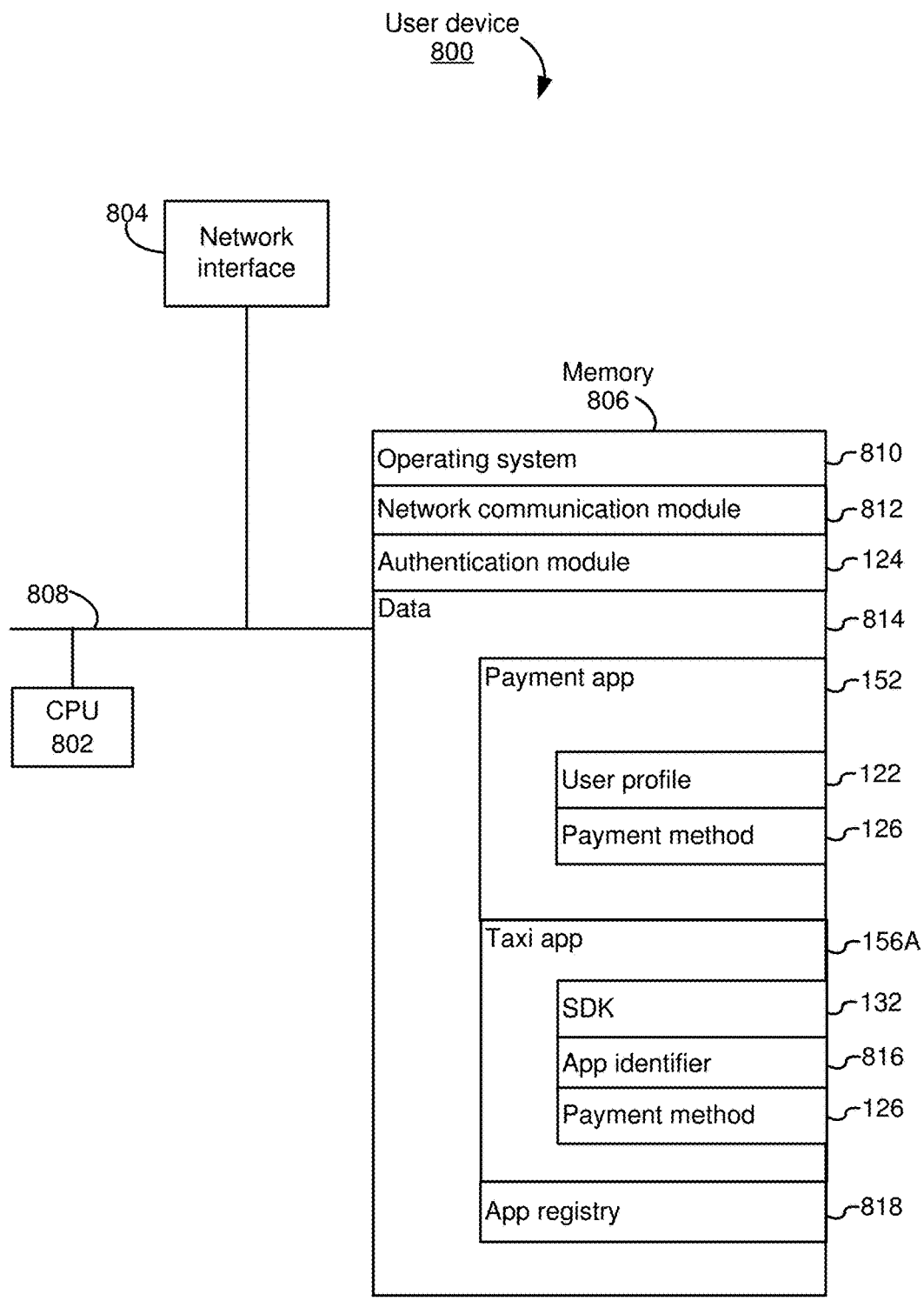
FIG. 8 is a schematic view illustrating an embodiment of a user device.

FIG. 8 is a schematic view illustrating an embodiment of a user device 800, which can be the user device 102 shown in FIG. 1. The user device 800 in some implementations includes one or more processing units CPU(s) 802 (also referred to as hardware processors), one or more secured elements 803, one or more network interfaces 804, a user interface 805, a memory 808, and one or more communication buses 808 for interconnecting these components. The communication buses 808 optionally include circuitry (sometimes called a chipset) that interconnects and controls communications between system components. The memory 808 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 808 optionally includes one or more storage devices remotely located from the CPU(s) 802. The memory 808, or alternatively the non-volatile memory device(s) within the memory 808, comprises a non-transitory computer readable storage medium. In some implementations, the memory 808 or alternatively the non-transitory computer readable storage medium stores the following programs, modules and data structures, or a subset thereof:

- an operating system 810, which includes procedures for handling various basic system services and for performing hardware dependent tasks;
- a network communication module (or instructions) 812 for connecting the device 800 with other devices (e.g., another user device 102) via one or more network interfaces 804 (wired or wireless);
- an authentication module 124 for authenticating a user on the user device 800 as well as in one or more apps installed on the user device 800;
- data 814 stored on the user device 800, which may include:
  - a payment app 152, which may include:
    - a user profile of a user logged into the payment app 152; and
    - a payment method 126 that a user registered in the payment app 152;
  - a taxi app 156A, which may include:
    - an SDK 132 that provides one or more APIs for communicating with the payment app or another app installed on the user device 800;
    - an app identifier 816 for uniquely identifying the taxi app 156A to another app, e.g., for the purpose of communications between apps; and
    - the payment method 126 enabled through the payment app 152; and
  - an app registry 818 for identifying one or more app downloaded onto, installed on, executed on, deleted from (or a combination thereof) the user device 800, e.g., by way of their corresponding app identifiers.

In some implementations, one or more of the above identified elements are stored in one or more of the previously mentioned memory devices, and correspond to a set of instructions for performing one or more functions described above. The above identified modules or programs (e.g., sets of instructions) need not be implemented as separate software programs, procedures or modules, and thus various subsets of these modules may be combined or otherwise re-arranged in various implementations. In some implementations, the memory 806 optionally stores a subset of the modules and data structures identified above. Furthermore, the memory 806 may store additional modules and data structures not described above.

Although FIG. 8 shows a "user device 800," respectively, FIGS. 7 and 8 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer device, comprising:
   one or more processors, one or more computer-readable memories, with program instructions stored on the one or more computer-readable memories, the one or more processors configured to execute the program instructions to cause the computer device to perform operations comprising:
   in response to detecting a user action within a first application on the computer device, identifying a second application installed on the computer device, wherein the second application is different from the first application, and wherein a user of the computer device has been authenticated on the second application;
   identifying, based on an analysis of an application registry corresponding to the computer device, that the user has been successfully authenticated on the second application;
   obtaining, via a first application programming interface (API) of the second application, a first set of user data associated with the user, from the second application;
   determining that first data of the first set of user data obtained from the second application installed on the computer device does not correspond to a second set of user data associated with the first application installed on the computer device; and in response to determining that the first data of the first set of user data does not correspond to the second set of user data associated with the first application, causing at least a first portion of the second set of user data to be updated, wherein the updated at least the first portion of the second set of user data corresponds to the first data of the first set of user data.

2. The computer device of claim 1, wherein the causing at least the first portion of the second set of user data to be updated includes adding a second data that corresponds to the first data to the second set of user data.

3. The computer device of claim 1, wherein the causing the at least the first portion of the second set of user data to be updated includes altering the at least the first portion of the second set of user data.

4. The computer device of claim 1, wherein the first data corresponds to information associated with a user preference corresponding to the user.

5. The computer device of claim 1, wherein the first data corresponds to user information associated with the user that includes a user address, a user billing address, or a user preferred method of payment.

6. The computer device of claim 1, the operations further comprising:
obtaining via a second application programming interface (API) of a third application installed on the computer device, a third set of user data associated with the user, from the third application;
determining that a first data of the third set of user data does not correspond to the second set of user data associated with the first application; and
in response to determining that the first data of the third set of user data does not correspond to the second set of user data associated with the first application, causing at least a second portion of the second set of user data to be updated, wherein the updated at least the second portion of the second set of user data corresponds to the first data of the third set of user data.

7. The computer device of claim 1, wherein the user action is an execution of the first application after installation.

8. A method comprising:
in response to detecting a user action within a first application installed on a computer device, identifying, by analyzing an application registry of the computer device, a second application installed on the computer device, wherein the second application is different from the first application;
identifying that a user has successfully logged on to the second application;
obtaining, by the computer device, via a first application programming interface (API) of the second application, a first set of user data associated with the user, from the second application;
determining, by the computer device, that a first data of the first set of user data does not correspond to a second set of user data associated with the first application; and
in response to determining that the first data of the first set of user data does not correspond to the second set of user data associated with the first application, causing, by the computer device, at least a first portion of the second set of user data to be updated, wherein the updated at least the first portion of the second set of user data corresponds to the first data of the first set of user data.

9. The method of claim 8, wherein the causing, by the computer device, at least the first portion of the second set of user data to be updated includes adding a second data that corresponds to the first data to the second set of user data.

10. The method of claim 8, wherein the causing, by the computer device, the at least the first portion of the second set of user data to be updated includes altering the at least the first portion of the second set of user data.

11. The method of claim 8, wherein the first data corresponds to information associated with a user preference corresponding to the user.

12. The method of claim 8, wherein the first data corresponds to user information associated with the user that includes a user-preferred method of payment.

13. The method of claim 8, further comprising:
obtaining, by the computer device, via a second application programming interface (API) of a third application installed on the computer device, a third set of user data associated with the user, from the third application;
determining, by the computer device, that a first data of the third set of user data does not correspond to the second set of user data associated with the first application; and
in response to determining that the first data of the third set of user data does not correspond to the second set of user data associated with the first application, causing, by the computer device, at least a second portion of the second set of user data to be updated, wherein the updated at least the second portion of the second set of user data corresponds to the first data of the third set of user data.

14. The method of claim 8, wherein the first data corresponds to information associated with personal information corresponding to the user.

15. The method of claim 14, wherein the personal information includes a user name and email address.

16. A computer program product comprising:
one or more non-transitory computer-readable tangible storage devices, and program instructions stored on at least one of the one or more non-transitory computer-readable tangible storage devices, the program instructions when executed cause a computer device to perform operations comprising:
in response to detecting a user action within a first application on the computer device a second application installed on the computer device, identifying, by an analysis of an application registry corresponding to the computer device, that a user has been successfully authenticated on the second application, wherein the second application is different from the first application;
obtaining, via a first application programming interface (API) of the second application, a first set of user data associated with the user, from the second application;
determining that a first data of the first set of user data does not correspond to a second set of user data associated with the first application; and
in response to determining that the first data of the first set of user data does not correspond to the second set of user data associated with the first application, causing at least a first portion of the second set of user data to be updated, wherein the updated at least the first portion of the second set of user data corresponds to the first data of the first set of user data.

17. The computer program product of claim 16, wherein the causing at least the first portion of the second set of user data to be updated includes adding a second data that corresponds to the first data to the second set of user data.

18. The computer program product of claim 16, wherein the causing the at least the first portion of the second set of user data to be updated includes altering the at least the first portion of the second set of user data.

19. The computer program product of claim 16, wherein the first data corresponds to information associated with a user preference corresponding to the user.

20. The computer program product of claim 16, wherein the first data corresponds to user information associated with the user that includes a user address or a user-preferred method of payment.

\* \* \* \* \*